United States Patent
Byrne et al.

(10) Patent No.: US 10,979,611 B2
(45) Date of Patent: *Apr. 13, 2021

(54) METHOD OF ASSEMBLING CAMERA FOR VEHICULAR APPLICATIONS

(71) Applicant: MAGNA ELECTRONICS INC., Auburn Hills, MI (US)

(72) Inventors: Steven V. Byrne, Goodrich, MI (US); Ben Stickler, Plymouth, MI (US); Richard Rieden, Clinton Township, MI (US); Matthew C. Sesti, Williamston, MI (US); Brian D. Brasier, Howell, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/729,786

(22) Filed: Dec. 30, 2019

(65) Prior Publication Data

US 2020/0137275 A1    Apr. 30, 2020

Related U.S. Application Data

(63) Continuation of application No. 15/996,758, filed on Jun. 4, 2018, now Pat. No. 10,523,853, which is a
(Continued)

(51) Int. Cl.
*H04N 5/225* (2006.01)
*B60R 11/04* (2006.01)
*B60R 1/00* (2006.01)

(52) U.S. Cl.
CPC ............. *H04N 5/2257* (2013.01); *B60R 1/00* (2013.01); *B60R 11/04* (2013.01); *H04N 5/2252* (2013.01);
(Continued)

(58) Field of Classification Search
CPC .. H04N 5/2257; H04N 5/2253; H04N 5/2254; H04N 5/2252; B60R 11/04; B60R 1/00; B60R 2300/8006; B60R 2300/8026
See application file for complete search history.

(56) References Cited

U.S. PATENT DOCUMENTS 4,634,884 A    1/1987  Hayashimoto et al.
4,712,879 A   12/1987  Lynam et al.
(Continued)

*Primary Examiner* — Ahmed A Berhan
(74) *Attorney, Agent, or Firm* — Honigman LLP

(57) ABSTRACT

A method of assembling a vehicular camera includes providing a metallic front housing member, a metallic rear housing member, a lens assembly and a circuit board. The front housing member has a lens receiving portion and a circuit board attachment portion. An imager is disposed on a first side of the circuit board and a connector is disposed on a second side of the circuit board. With the circuit board attached at the front housing member and with the lens assembly disposed at a lens receiving portion of the front housing member, images are focused at an imaging plane of the imager by adjusting the lens assembly relative to the imager. With the images focused at the imaging plane of the imager, the lens assembly is retained relative to the front housing member via an ultra-violet (UV) curable adhesive. The front housing member and the rear housing member are attached.

20 Claims, 6 Drawing Sheets

Related U.S. Application Data continuation of application No. 15/180,644, filed on Jun. 13, 2016, now Pat. No. 9,992,392, which is a continuation of application No. 14/672,699, filed on Mar. 30, 2015, now Pat. No. 9,365,160, which is a continuation of application No. 13/936,708, filed on Jul. 8, 2013, now Pat. No. 8,994,878, which is a continuation of application No. 12/580,496, filed on Oct. 16, 2009, now Pat. No. 8,482,664.

(60) Provisional application No. 61/148,568, filed on Jan. 30, 2009, provisional application No. 61/105,852, filed on Oct. 16, 2008.

(52) U.S. Cl.
CPC ......... *H04N 5/2253* (2013.01); *H04N 5/2254* (2013.01); *B60R 2300/8006* (2013.01); *B60R 2300/8026* (2013.01)

(56) References Cited

U.S. PATENT DOCUMENTS

| | | | |
|---|---|---|---|
| 4,786,966 A | 11/1988 | Hanson et al. | |
| 5,073,012 A | 12/1991 | Lynam | |
| 5,076,673 A | 12/1991 | Lynam et al. | |
| 5,115,346 A | 5/1992 | Lynam | |
| 5,130,804 A | 7/1992 | Tamura | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,204,615 A | 4/1993 | Richards et al. | |
| 5,253,109 A | 10/1993 | O'Farrell et al. | |
| 5,371,659 A | 12/1994 | Pastrick et al. | |
| 5,406,414 A | 4/1995 | O'Farrell et al. | |
| 5,497,306 A | 3/1996 | Pastrick | |
| 5,525,264 A | 6/1996 | Cronin et al. | |
| 5,550,677 A | 8/1996 | Schofield et al. | |
| 5,559,556 A | 9/1996 | Kageback | |
| 5,567,360 A | 10/1996 | Varaprasad et al. | |
| 5,610,756 A | 3/1997 | Lynam et al. | |
| 5,657,539 A | 8/1997 | Orikasa et al. | |
| 5,668,663 A | 9/1997 | Varaprasad et al. | |
| 5,669,699 A | 9/1997 | Pastrick et al. | |
| 5,670,935 A | 9/1997 | Schofield et al. | |
| 5,724,187 A | 3/1998 | Varaprasad et al. | |
| 5,760,962 A | 6/1998 | Schofield et al. | |
| 5,796,094 A | 8/1998 | Schofield et al. | |
| 5,821,532 A | 10/1998 | Beaman et al. | |
| 5,823,654 A | 10/1998 | Pastrick et al. | |
| 5,854,708 A | 12/1998 | Komatsu et al. | |
| 5,872,332 A | 2/1999 | Verma | |
| 5,877,897 A | 3/1999 | Schofield et al. | |
| 5,910,854 A | 6/1999 | Varaprasad et al. | |
| 5,920,061 A | 7/1999 | Feng | |
| 5,949,331 A | 9/1999 | Schofield et al. | |
| 5,978,017 A | 11/1999 | Tino | |
| 6,002,544 A | 12/1999 | Yatsu | |
| 6,013,372 A | 1/2000 | Hayakawa et al. | |
| 6,071,606 A | 6/2000 | Yamazaki et al. | |
| 6,072,814 A | 6/2000 | Ryan et al. | |
| 6,087,953 A | 7/2000 | DeLine et al. | |
| 6,097,023 A | 8/2000 | Schofield et al. | |
| 6,117,193 A | 9/2000 | Glenn | |
| 6,151,065 A * | 11/2000 | Steed ............ | B60Q 1/0023 348/148 |
| 6,154,306 A | 11/2000 | Varaprasad et al. | |
| 6,172,613 B1 | 1/2001 | DeLine et al. | |
| 6,176,602 B1 | 1/2001 | Pastrick et al. | |
| 6,178,034 B1 | 1/2001 | Allemand et al. | |
| 6,193,378 B1 | 2/2001 | Tonar et al. | |
| 6,201,642 B1 | 3/2001 | Bos | |
| 6,222,447 B1 | 4/2001 | Schofield et al. | |
| 6,259,475 B1 | 7/2001 | Ramachandran et al. | |
| 6,276,821 B1 | 8/2001 | Pastrick et al. | |
| 6,278,377 B1 | 8/2001 | DeLine et al. | |
| 6,292,311 B1 | 9/2001 | Bohn et al. | |
| 6,302,545 B1 | 10/2001 | Schofield et al. | |
| 6,320,176 B1 | 11/2001 | Schofield et al. | |
| 6,326,613 B1 | 12/2001 | Heslin et al. | |
| 6,353,392 B1 | 3/2002 | Schofield et al. | |
| 6,396,397 B1 | 5/2002 | Bos et al. | |
| 6,428,172 B1 | 8/2002 | Hutzel et al. | |
| 6,454,449 B2 | 9/2002 | Nestell et al. | |
| 6,481,003 B1 | 11/2002 | Maeda | |
| 6,483,101 B1 | 11/2002 | Webster | |
| 6,498,620 B2 | 12/2002 | Schofield et al. | |
| 6,523,964 B2 | 2/2003 | Schofield et al. | |
| 6,535,242 B1 | 3/2003 | Strumolo et al. | |
| 6,559,435 B2 | 5/2003 | Schofield et al. | |
| 6,559,439 B1 | 5/2003 | Tsuchida et al. | |
| 6,590,658 B2 | 7/2003 | Case et al. | |
| 6,603,612 B2 | 8/2003 | Nakano | |
| 6,611,202 B2 | 8/2003 | Schofield et al. | |
| 6,651,187 B2 | 11/2003 | Lacey, III | |
| 6,654,187 B2 | 11/2003 | Ning | |
| 6,690,268 B2 | 2/2004 | Schofield et al. | |
| 6,717,610 B1 | 4/2004 | Bos et al. | |
| 6,757,109 B2 | 6/2004 | Bos | |
| 6,805,767 B2 | 10/2004 | Shinomiya | |
| 6,806,452 B2 | 10/2004 | Bos et al. | |
| 6,822,563 B2 | 11/2004 | Bos et al. | |
| 6,831,261 B2 | 12/2004 | Schofield et al. | |
| 6,891,563 B2 | 5/2005 | Schofield et al. | |
| 6,897,432 B2 | 5/2005 | Schmidtke et al. | |
| 6,946,978 B2 | 9/2005 | Schofield | |
| 6,977,619 B2 | 12/2005 | March et al. | |
| 7,004,606 B2 | 2/2006 | Schofield | |
| 7,005,974 B2 | 2/2006 | McMahon et al. | |
| 7,015,944 B2 | 3/2006 | Holz et al. | |
| 7,031,075 B2 | 4/2006 | Tsuji | |
| 7,038,577 B2 | 5/2006 | Pawlicki et al. | |
| 7,095,123 B2 | 8/2006 | Prior | |
| 7,095,572 B2 | 8/2006 | Lee et al. | |
| 7,123,168 B2 | 10/2006 | Schofield | |
| 7,215,479 B1 | 5/2007 | Bakin | |
| 7,255,451 B2 | 8/2007 | McCabe et al. | |
| 7,268,957 B2 | 9/2007 | Frenzel et al. | |
| 7,289,037 B2 | 10/2007 | Uken et al. | |
| 7,339,149 B1 | 3/2008 | Schofield et al. | |
| 7,370,983 B2 | 5/2008 | DeWind et al. | |
| 7,391,458 B2 | 6/2008 | Sakamoto | |
| 7,419,315 B2 | 9/2008 | Hirata et al. | |
| 7,423,665 B2 | 9/2008 | Ray et al. | |
| 7,453,509 B2 | 11/2008 | Losehand et al. | |
| 7,480,149 B2 | 1/2009 | DeWard et al. | |
| 7,536,316 B2 | 5/2009 | Ozer et al. | |
| 7,599,134 B2 | 10/2009 | Bechtel et al. | |
| 7,665,915 B2 | 2/2010 | Lee | |
| 7,697,056 B2 | 4/2010 | Huang | |
| 7,768,574 B2 | 8/2010 | Humpston | |
| 7,965,336 B2 | 6/2011 | Bingle et al. | |
| 8,064,146 B2 | 11/2011 | Iwasaki | |
| 8,120,652 B2 | 2/2012 | Bechtel et al. | |
| 8,256,821 B2 | 9/2012 | Lawlor et al. | |
| 8,318,512 B2 | 11/2012 | Shah et al. | |
| 8,482,664 B2 | 7/2013 | Byrne et al. | |
| 8,542,451 B2 | 9/2013 | Lu et al. | |
| 8,994,878 B2 | 3/2015 | Byrne et al. | |
| 9,277,104 B2 | 3/2016 | Sesti et al. | |
| 9,338,334 B2 | 5/2016 | Lu et al. | |
| 9,365,160 B2 | 6/2016 | Byrne et al. | |
| 9,487,159 B2 | 11/2016 | Achenbach | |
| 9,596,387 B2 | 3/2017 | Achenbach et al. | |
| 9,992,392 B2 | 6/2018 | Byrne et al. | |
| 10,523,853 B2 | 12/2019 | Byrne et al. | |
| 2002/0159270 A1 | 10/2002 | Lynam et al. | |
| 2002/0167605 A1 | 11/2002 | Akimoto et al. | |
| 2002/0175832 A1 | 11/2002 | Mizusawa | |
| 2003/0090569 A1 | 5/2003 | Poechmueller | |
| 2003/0137595 A1 | 7/2003 | Takachi | |
| 2004/0016870 A1 | 1/2004 | Pawlicki et al. | |
| 2004/0032321 A1 | 2/2004 | McMahon et al. | |
| 2004/0051634 A1 | 3/2004 | Schofield et al. | |

(56) References Cited

U.S. PATENT DOCUMENTS

| | | |
|---|---|---|
| 2005/0104995 A1 | 5/2005 | Spryshak et al. |
| 2005/0141106 A1 | 6/2005 | Lee et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0044450 A1 * | 3/2006 | Wolterink ............ G02B 13/006 348/340 |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 * | 8/2006 | Bingle ................ H04N 5/2254 396/419 |
| 2006/0184297 A1 | 8/2006 | Higgins-Luthman |
| 2007/0040034 A1 | 2/2007 | Hennick |
| 2007/0096020 A1 | 5/2007 | Mitsugi et al. |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2008/0122965 A1 | 5/2008 | Fang |
| 2009/0010494 A1 | 1/2009 | Bechtel et al. |
| 2009/0012203 A1 | 1/2009 | Nakanishi et al. |
| 2009/0244361 A1 * | 10/2009 | Gebauer ............... H04N 5/2253 348/373 |
| 2009/0295181 A1 | 12/2009 | Lawlor et al. |
| 2010/0015713 A1 | 1/2010 | Deeter et al. |
| 2010/0097519 A1 | 4/2010 | Byrne et al. |
| 2010/0103308 A1 | 4/2010 | Butterfield et al. |
| 2010/0279439 A1 | 11/2010 | Shah et al. |
| 2011/0025850 A1 | 2/2011 | Maekawa et al. |
| 2011/0298968 A1 | 12/2011 | Tseng et al. |
| 2012/0081550 A1 | 4/2012 | Sewell |
| 2012/0265416 A1 | 10/2012 | Lu et al. |
| 2014/0000804 A1 | 1/2014 | Looi et al. |
| 2014/0022657 A1 | 1/2014 | Lu et al. |
| 2014/0313337 A1 | 10/2014 | Devota et al. |
| 2015/0327398 A1 | 11/2015 | Achenbach et al. |
| 2016/0255257 A1 | 9/2016 | Lu et al. |

* cited by examiner

METHOD OF ASSEMBLING CAMERA FOR VEHICULAR APPLICATIONS

CROSS REFERENCE TO RELATED APPLICATIONS

This application is a continuation of U.S. patent application Ser. No. 15/996,758, filed Jun. 4, 2018, now U.S. Pat. No. 10,523,853, which is a continuation of U.S. patent application Ser. No. 15/180,644, filed Jun. 13, 2016, now U.S. Pat. No. 9,992,392, which is a continuation of U.S. patent application Ser. No. 14/672,699, filed Mar. 30, 2015, now U.S. Pat. No. 9,365,160, which is a continuation of U.S. patent application Ser. No. 13/936,708, filed Jul. 8, 2013, now U.S. Pat. No. 8,994,878, which is a continuation of U.S. patent application Ser. No. 12/580,496, filed Oct. 16, 2009, now U.S. Pat. No. 8,482,664, which claims the benefits of U.S. provisional application Ser. No. 61/148,568, filed Jan. 30, 2009, and U.S. provisional application Ser. No. 61/105,852, filed Oct. 16, 2008.

FIELD OF THE INVENTION

The present invention relates to a camera for use in vehicles, and more particularly rearview cameras for use in vehicles.

BACKGROUND OF THE INVENTION

A typical camera for mounting on a vehicle has a lens member, an imaging element, a circuit board and housing members that connect together. It is generally desirable to reduce the cost of manufacture of such cameras and to improve their reliability.

As an example, some cameras may use an epoxy to mount the lens member to the front housing member. However, the epoxy that is used may be susceptible to softening under high temperature, at which point the lens member becomes vulnerable to being moved out of focus with the imaging element. It would be desirable to reduce the vulnerability of the lens member to movement under high temperature.

Another problem with some cameras relates to the cable that exits the camera and extends to other vehicular components. A camera may be positioned within a protective housing, which may be closed about the camera or sensor and secured together. The camera includes a wire harness or wire or lead electrically connected to circuitry of the camera and extending through the camera housing for electrical connection to a vehicle wire harness or the like.

A need exists for an inexpensive camera cable exit strategy that is space efficient, hermetically sealed, provides substantial of cable strain relief in any axis (such as, for example, more than about 110 N of cable strain relief in any axis), and can withstand the stresses of automotive environmental conditions. Currently used grommets in the industry tend to leak when subjected to off axis stresses. Also, many existing exit strategies incorporate additional and complex contact interfaces along the conductive paths from wire to board so that pins or specific terminals are introduced which can be press-fit or over-molded into a sealed plastic interface. This may increase cost, complexity and quality risks associated with the camera cable.

It would be advantageous to provide a camera that addresses one or more of these and other considerations.

SUMMARY OF THE INVENTION

In a first aspect, the invention is directed to a camera for mounting on a vehicle, wherein the camera housing made up of two housing members, with a conductive coating on the interior of each of the housing members. The two housing members mate together using an interference fit, to provide a greater assurance that they are electrically connected to each other. One of the housing members is connected to ground.

In a particular embodiment of the first aspect, the camera includes a front housing member, a lens member, an imaging element, a circuit board and a rear housing member. The front housing member has a front housing member interior surface that has a front housing member coating of electrically conductive material thereon. The lens member is mounted to the front housing member. The imaging element is positioned to receive images from the lens member. The circuit board is configured to send to another component signals relating to images received by the imaging element. The rear housing member has a rear housing member interior surface that has a rear housing member coating thereon. The front housing member and the rear housing member are sized to mate together with an interference fit such that the front housing member coating and the rear housing member coating engage each other. One of the front and rear housing member coatings is electrically connectable to ground.

In a second aspect, the invention is directed to a camera for a vehicle, having a lens member that is movable to a selected position on the front housing member, optionally by means of engagement of a threaded portion on the lens member and a corresponding threaded portion on the front housing member. The lens member is holdable in the selected position by an interference fit.

In a particular embodiment of the first aspect, the camera includes a front housing member, a lens member, an imaging element and a circuit board. The front housing member has a lens member receiving aperture therein having a front housing member threaded portion, and a front housing member locking portion. The lens member is mounted to the front housing member. The lens member has a lens member threaded portion for mating with the front housing member threaded portion, and a lens member locking portion. The lens member locking portion and the front housing member locking portion are sized to mate together with an interference fit to hold the lens member in a selected position relative to the front housing member. The imaging element is positioned to receive video input from the lens member. The circuit board is configured to send to another component signals relating to video input received by the imaging element.

In another aspect, the present invention provides a camera module that has a housing and a wire harness or wire or lead that is electrically connected to circuitry of the camera and that extends through the camera housing for electrical connection to a vehicle wire harness or the like. The wire or lead extends through a portion of the housing with the housing disposed at the wire prior to connection of the wire to the circuitry of the camera. The electrical connection of the wire to the camera circuitry is made as the housing is assembled. The joint at where the wire extends outward from the housing portion is sealed, such as via shrink wrapping or the like.

According to another aspect of the present invention, a camera module for a vision system of a vehicle includes a circuit board, a lens holder or lens mounting assembly for mounting a lens assembly, and an outer shell or housing portion. The circuit board includes a lens assembly, an imaging sensor and associated circuitry. The outer shell or housing portion includes first and second housing portions, with a wire or lead extending through the first housing portion for connection to the circuit board. The wire includes a connector at the first housing portion that is configured to connect to a connecting element at the circuit board when the first and second housing portions are assembled together to encompass or house the circuit board within the outer shell or housing portion.

The outer shell or housing portion may comprise a lens receiving portion and a cable receiving portion, with the lens receiving portion and the cable receiving portion being connected together to substantially house the circuit element within the housing portion. The cable receiving portion includes a connector receiving portion and a wire receiving portion, with the connector receiving portion being formed to receive and retain the cable connector therein and the wire receiving portion being formed to receive and retain the cable portion therein.

These and other objects, advantages, purposes and features of the present invention will become apparent upon review of the following specification in conjunction with the drawings.

BRIEF DESCRIPTION OF THE DRAWINGS

The present invention will now be described by way of example only with reference to the attached drawings, in which:

FIG. 1b is a sectional view along section line 1b-1b shown in FIG. 1a;

DETAILED DESCRIPTION OF THE INVENTION

Figure 1A:
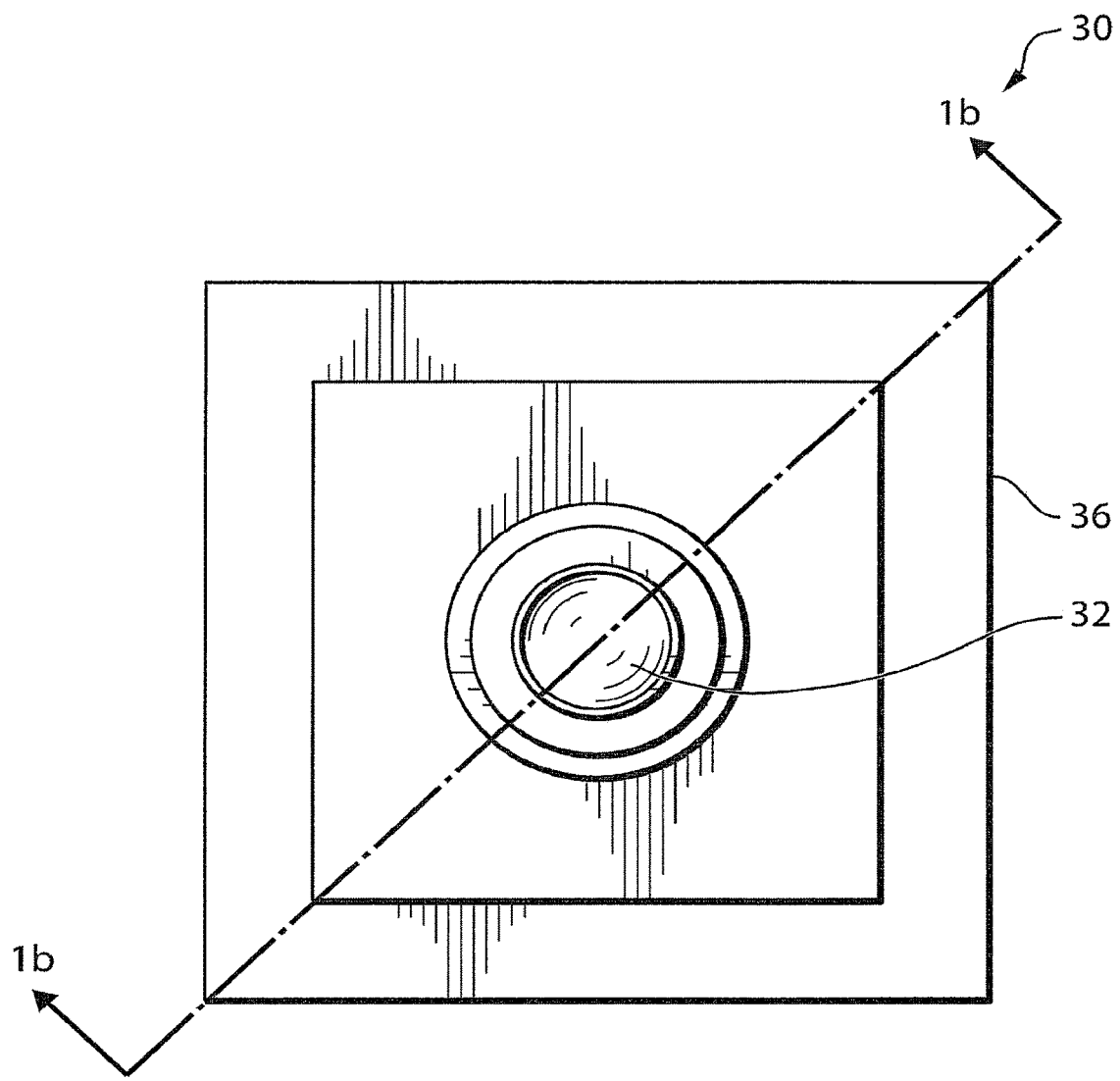
FIG. 1a is a front end view of a camera for a vehicle in accordance with an embodiment of the present invention.
Figure 1B:
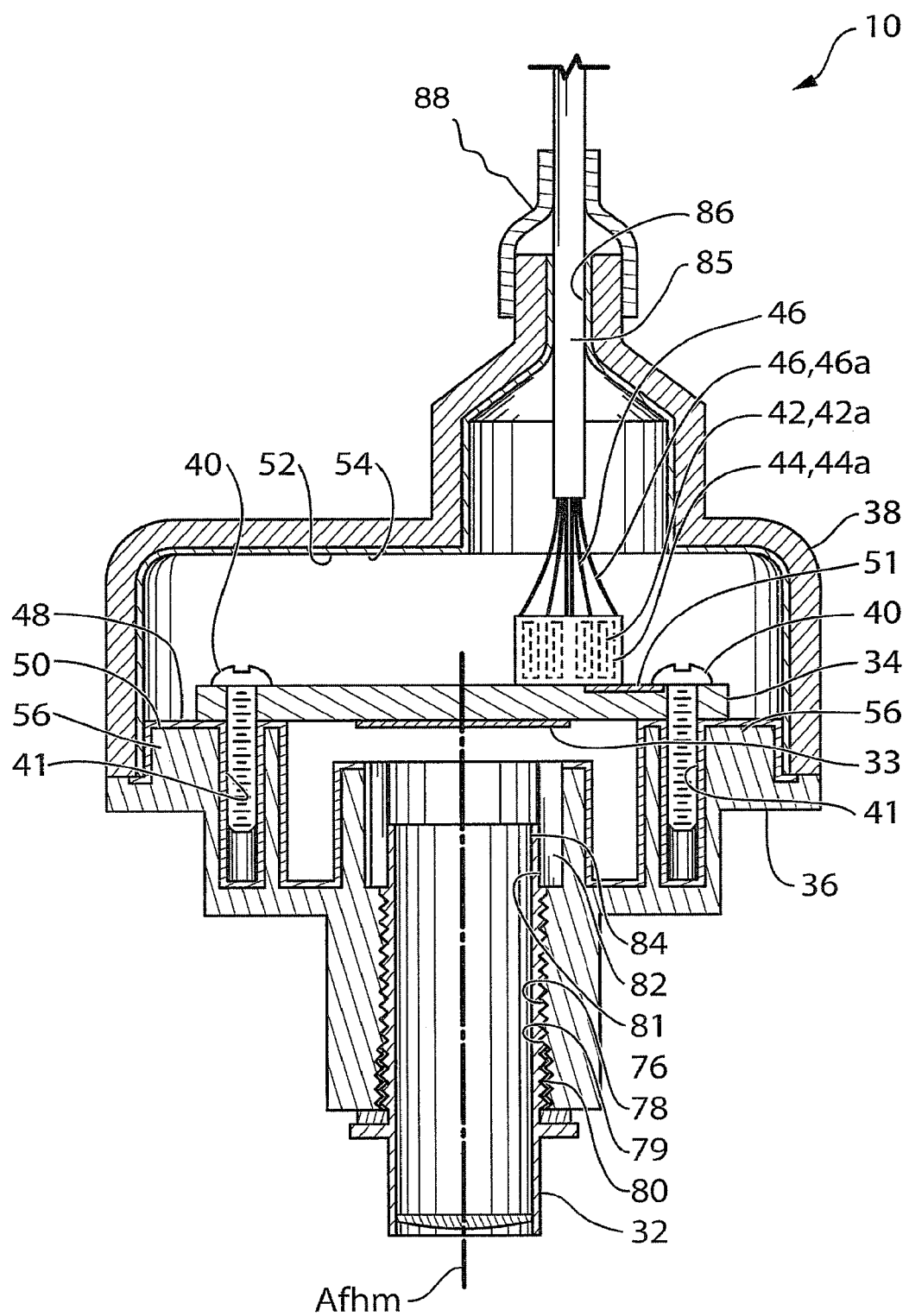

Reference is made to FIG. 1a, which shows a camera 30 for use in a vehicle, and in particular for use as a rearview camera in a vehicle, in accordance with an embodiment of the present invention. In one aspect, the camera 30 is configured to provide grounding protection and electromagnetic compatibility (EMC) protection simply and without adding to the complexity of the assembly. Referring to FIG. 1b, which is a sectional view of the camera 30, the camera 30 includes a lens 32, an imaging element 33, a circuit board 34, a front housing member 36 and a rear housing member 38.

Note that the terms 'front' and 'rear' as used in the present document refer to the front of the camera 30 (i.e. the portion of the camera where the lens member is located), and the rear of the camera 30 (i.e. the portion of the camera 30 opposite the front of the camera 30). When the camera 30 is used in a rearview application in a vehicle, the front of the camera 30 thus faces rearwardly relative to the vehicle and the rear of the camera 30 faces towards the front of the vehicle.

The lens member 32 may be any suitable lens member known in the art, and is mounted to the front housing member 36. The imaging element 33 is positioned in a selected position to receive images through the lens member 32. The imaging element 33 may be any suitable imaging element a charge-coupled device (CCD) or a complimentary metal-oxide semiconductor (CMOS) sensor. The circuit board 34 receives signals from the imaging element 33 and sends signals relating to images received on the imaging element 33 to one or more other components such as another computing device within the vehicle. The imaging element 33 may be mounted directly on the circuit board 34.

The circuit board 34 may be mounted to the front housing member 36 in any suitable way. For example, the circuit board 34 may be mounted to the front housing member 36 by a plurality of circuit board mounting fasteners 40, which may be mechanical fasteners such as machine screws that engage apertures 41 (e.g. threaded apertures) on the front housing member 16. A plurality of front electrical connectors 42 are provided on the circuit board 34.

The rear housing member 38 houses a plurality of rear electrical connectors 44 that are electrically connected at their front ends to the front electrical connectors 42 on the circuit board 34 and at their rear ends to a plurality of electrical conduits 46, which connect the circuit board 34 to associated elements in the vehicle.

The front electrical connectors 42 may be male electrical connectors, and the rear electrical connectors 44 may be female electrical connectors that receive the male front electrical connectors 42 as shown in FIG. 1b.

While a plurality of front and rear electrical connectors 42 and 44 are shown, it is alternatively possible for the camera 30 to have as few as one front electrical connector 42, one rear electrical connector 44 and one electrical conduit 46.

The front and rear housing members 36 and 38 may be made from any suitable material, such as a polymeric material. In instances wherein the front and rear housing members 36 and 38 may build up a static electrical charge it is preferable to provide means to inhibit such a buildup so as to protect components such as the circuit board 34. To inhibit the buildup of static electricity on the front housing member 36, a front housing member coating 48 of electrically conductive material may be provided on the front housing member interior surface, shown at 50. The aperture 41 may have the front housing member coating 36 thereon so that the circuit board mounting fastener 40 is in direct contact with the front housing member coating 36. The circuit board mounting fastener 40 may be made from an electrically conductive material. One of the front electrical connectors 42 may be a front ground connector 42a, and connects to a rear ground connector 44a, which in turn connects to a ground point within the vehicle (not shown) through one of the electrical conduits, shown at 46a. The front ground connector 42a may be electrically connected to the front housing member coating 36 any suitable way. For example, the front ground connector 42a may be electrically connected to the circuit board mounting fastener 40 by an electrical trace shown at 51 on the circuit board 34 or by some other suitable electrical conduit. The front ground connector 42a thereby conducts any buildup of electricity away from the front housing member 36 to the rear ground connector 44a, which in turn conducts the electricity to a ground point in the vehicle. The front housing member coating 36 may be any suitable material, such as Aluminum.

To inhibit the buildup of static electricity on the rear housing member 38, a rear housing member coating 52 of electrically conductive material may be provided on the rear housing member interior surface, shown at 54. The rear housing member coating 52 may be electrically (and physically) connected to the front housing member coating through engagement between the rear housing member interior surface 54 with a plurality of engagement ribs 56 on the front housing member interior surface 50, which have the front housing member coating 48 thereon. The engagement ribs 56 are more clearly shown in FIG. 2. Referring to FIG. 1b, to provide a relatively greater assurance of electrical communication between the rear and front housing member interior surfaces 54 and 48, the rear housing member interior surface 54 and the engagement ribs 56 may be sized to have an interference fit therebetween.

Any electrical charge that is built up on the rear housing member 38 is conducted away by the rear housing member coating 52 to the front housing member coating 48, through the electrically conductive circuit board mounting fastener 40, along the aforementioned electrical trace 51, through the front and rear electrical connectors 42a and 44a, through the ground conduit 46a out to ground at a suitable location in the vehicle. While three engagement ribs 56 are shown at two opposing corners of the front housing member 36, any suitable number of ribs 56 may be provided. The engagement between the ribs 56 and the rear housing member 38 align the rear housing member 38 with respect to the front housing member 36.

After the front and rear housing members 36 and 38 are mated together using the engagement ribs 56, they may be further joined by means of welding, adhesive, or any other suitable means.

In addition to providing a means for grounding the front and rear housing members 36 and 38, the front and rear housing member coatings 48 and 52 also provide EMC protection to the circuit board 34.

After the housing members 36 and 38 are mated together they may be further joined together by means of welding, adhesive or any other suitable means.

Referring to FIG. 1b, the structure shown for holding the lens member 32 in position relative to the front housing member 36 is shown, in accordance with another aspect of the present invention. The camera 30 is configured to hold the lens member 32 in position securely even at relatively high temperatures, such as temperatures that exceed 85 degrees Celsius.

The lens member 32 and the imaging element 33 are mounted at a selected distance from one another so as to focus images received by the lens member 32 on the imaging element 33. As noted above, the imaging element 33 may be mounted on the circuit board 34, which may itself be mounted at a fixed position on the front housing member 36 by any suitable means, such as by the plurality of circuit board mounting fasteners 40 which are received in the plurality of apertures 41 in the front housing member 36. To provide some adjustability for setting the distance between the lens member 32 and the imaging element 33, the lens member 32 may have thereon a threaded portion 76 that is received in an internally threaded portion 78 in the lens member receiving aperture, shown at 79, on the front housing member 36. In addition to the engagement of the threaded portions 76 and 78, a suitable bonding agent, shown at 80, such as an epoxy that is cured using ultra-violet (UV) light, may be applied between the lens member 32 and the front housing member 36 to retain the lens member 32 in a selected position relative to the imaging element 33. Additionally, the front housing member 36 may include a front housing member locking portion 81 with a plurality of lens member engagement ribs 82 thereon that are positioned and sized to form an interference fit with a lens member locking portion 84 on the lens member 32. The lens member engagement ribs 82 are shown more clearly in FIG. 2. In the embodiment shown in FIG. 2, three engagement ribs 82 are provided. In embodiments wherein three engagement ribs 82 are provided, they may be spaced about the perimeter of the lens member receiving aperture 79 sufficiently to hold the lens member 32 (FIG. 1b) centered with respect to the front housing member axis, shown at Afhm. A sufficient spacing for this purpose would be provided if the maximum angular spacing between any two adjacent engagement ribs 82 were less than 180 degrees of the lens member receiving aperture 79. In the embodiment shown, the spacing between any two adjacent engagement ribs 82 is 120 degrees.

Figure 2:
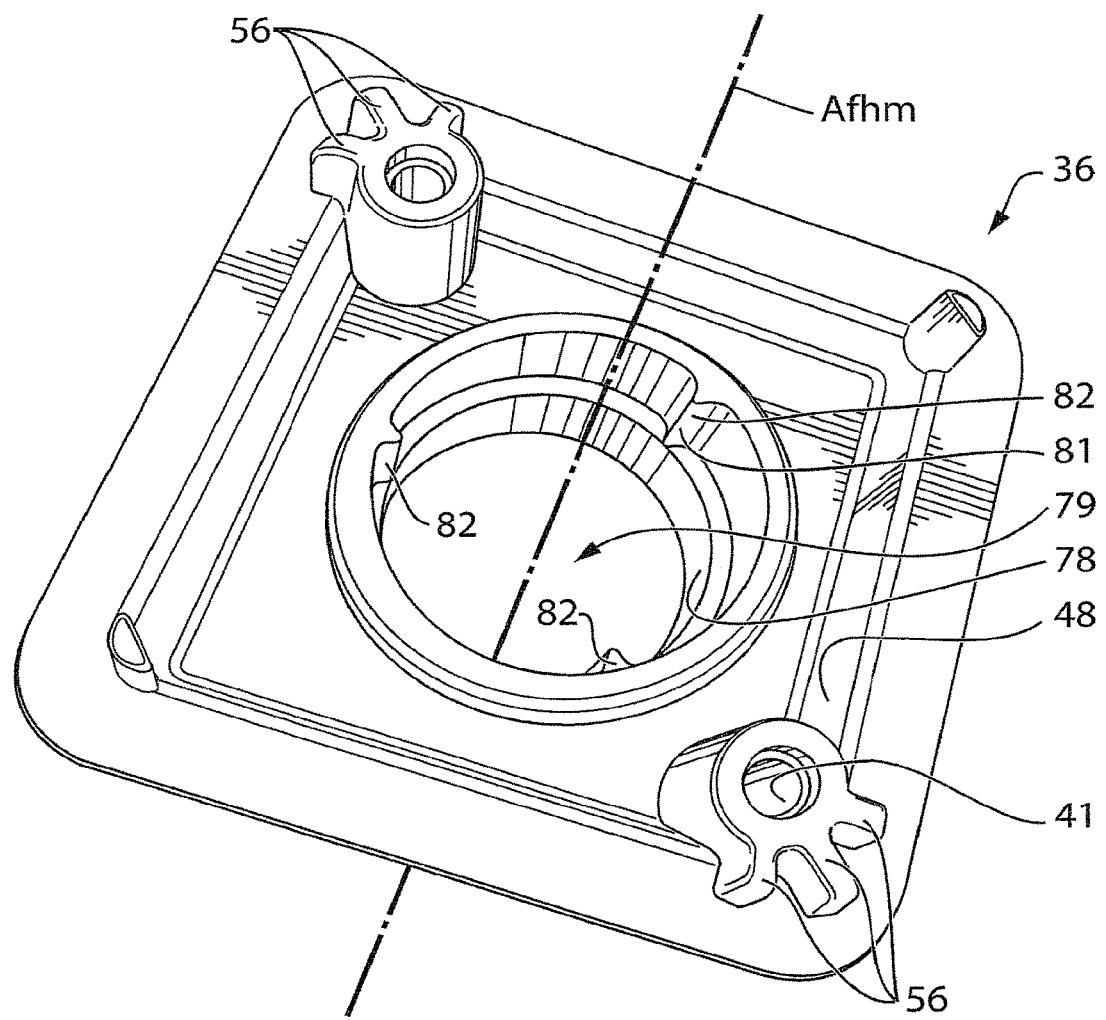
FIG. 2 is a perspective view of a front housing member that is part of the camera shown in FIGS. 1a and 1b.

While three engagement ribs 82 are shown in FIG. 2, it is, however, possible to have fewer or more lens member engagement ribs 82. For example, two engagement ribs could be provided, wherein each rib extends over an angular range instead of having an apex as shown for the ribs 82 shown FIG. 2.

While the engagement ribs 82 are shown as being on the front housing member locking portion 81, it is alternatively possible to provide them on the lens member locking portion 84.

It is optionally possible to omit the engagement ribs 82 and to simply provide an interference fit between two substantially cylindrical locking portions 81 and 84, however, it is contemplated that the use of engagement ribs 82 as shown in FIGS. 1b and 2 reduces the force required to rotate the lens member 32 to its optimal position for focusing images on the imaging element 33, while ensuring however, that the force required is sufficiently high to maintain a low likelihood of inadvertent movement of the lens member 32 during vehicle use.

Referring to FIG. 1b, providing the lens member engagement ribs 82 permits the lens member 32 to be held at a selected position in the front housing member 36 even at relatively high temperatures, such as a temperature that is greater than 85 degrees Celsius, that might reduce the effectiveness of the bonding agent 80 in embodiments where the bonding agent is provided. For greater clarity, it is optionally possible to omit the bonding agent 80 and to instead provide the lens member engagement ribs 82 as the primary means for holding the lens member 32 in place aside from the threaded portions 76 and 78.

The electrical conduits 46 may be bundled in a conduit sleeve 85 and may pass through an electrical conduit aperture 86 in the rear housing member 38. A seal member 88 may seal between the conduit sleeve 85 and the electrical conduit aperture 86. The seal member 88 may be any suitable type of seal member. For example, the seal member 88 may be a heat shrink member that is shrunk by application of heat to form a tightly sealed bond with the conduit sleeve 85 and rear housing member 38. The seal member 88 may further include a bonding agent, such as an adhesive on its interior wall to assist in bonding to the conduit sleeve 85 and rear housing member 38. In addition to providing a seal, the seal member 88 may further provide strain relief for the rear housing member 38, the conduit sleeve 85 and the electrical conduits 46 by providing some resistance to bending of the sleeve 85 and electrical conduits 46, and by providing some resistance to inadvertent withdrawal of the conduit sleeve 85 from the rear housing member 38.

Figure 3:
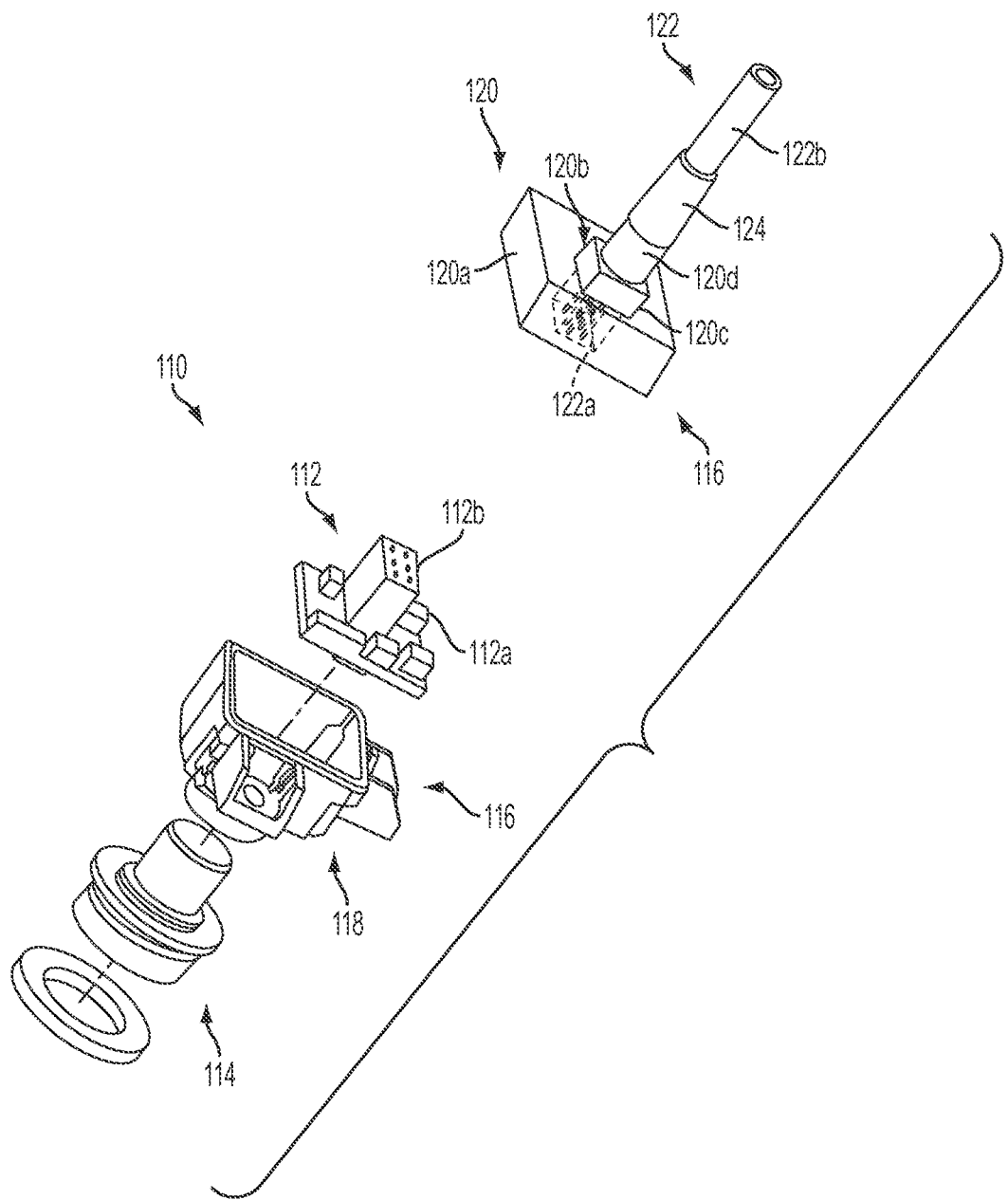
FIG. 3 is an exploded perspective view of an imaging device in accordance with another embodiment of the present invention.
Figure 4:
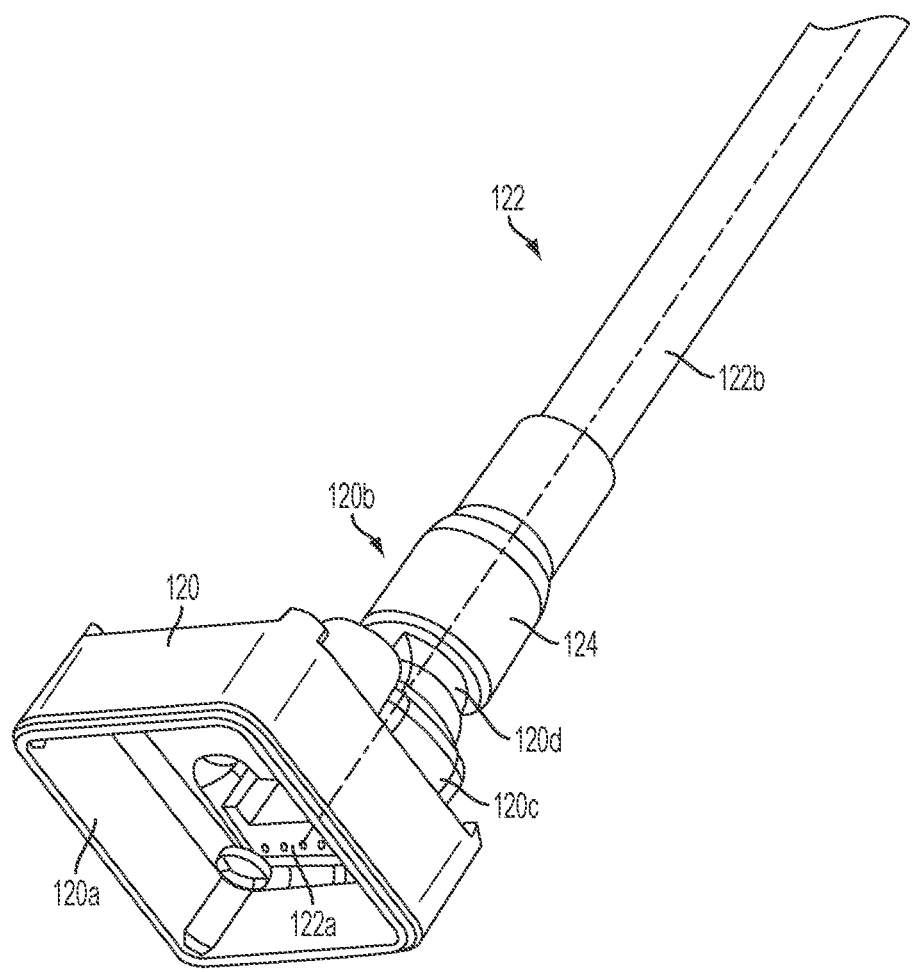
FIG. 4 is a perspective view of the cable and rear housing portion of the imaging device of FIG. 3.
Figure 5:
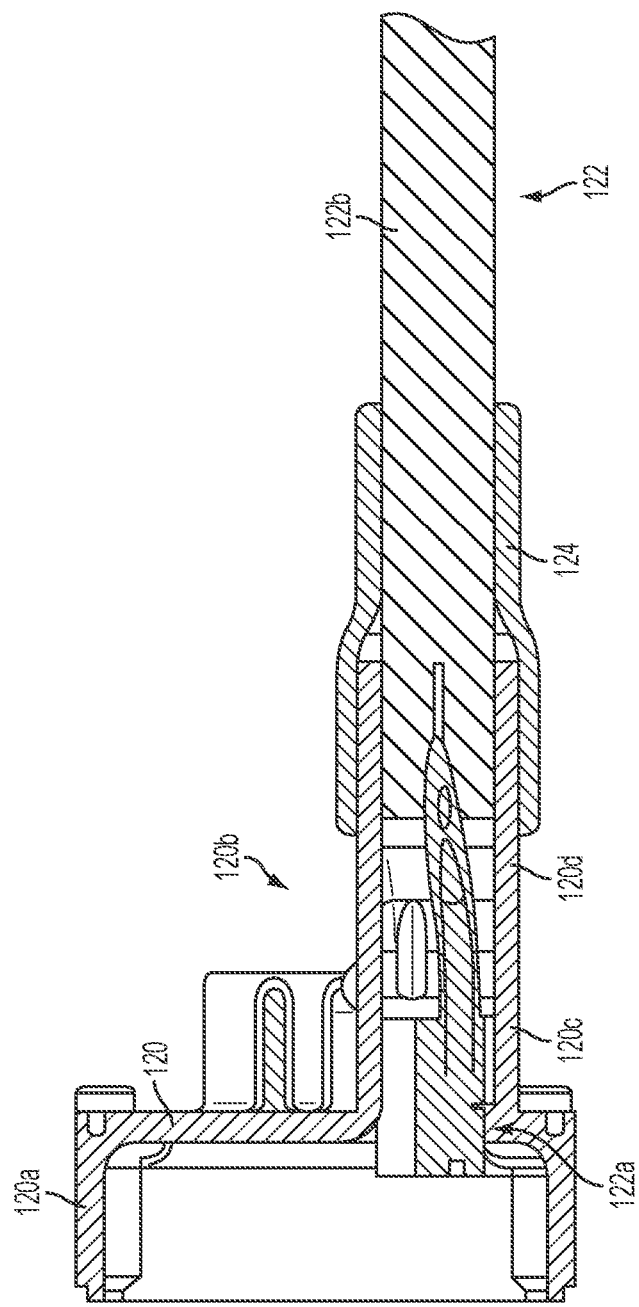
FIG. 5 is a sectional view of the cable and rear housing portion of FIG. 4.

Referring now to FIGS. 3-5 and the illustrative embodiments depicted therein, a camera or imaging device or module 110 is adapted for use on or in or at a vehicle and is associated with at least one vision system of the vehicle. Camera module 110 includes a circuit board or chip or element 112 (on which an imaging sensor and associated circuitry is established), a lens assembly 114 and a housing portion or outer shell 116. Housing portion 116 includes a front or lens receiving portion 118 and a rear or cable receiving portion 120 that are connected and sealed together (such as by laser welding or other suitable sealing means such as sonic welding or thermal sealing or adhesive sealing or mechanical sealing or the like) so that the housing portion encompasses or encases or houses the circuit board 112 and a portion of the lens assembly 114 to substantially or entirely encase or encapsulate the circuit board 112 and circuitry within the outer shell or housing portion 116. Camera module 110 also includes a cable or wire harness 122 that is electrically connected to the circuitry of circuit board 112 and that includes an electrical connector 122a (such as a multi-pin connector or plug or socket type connector or the like) at or within rear housing portion and an electrical wire or lead 122b that extends from rear housing portion 120 and that is electrically connectable to circuitry or a wire harness of the vehicle or the like, so as to provide power and communication and control between the vehicle and the camera module. The wire harness is received through and retained at rear housing portion 120 to provide enhanced sealing at the wire harness and housing portion junction, as discussed below.

As shown in FIG. 3, the lens assembly 114 may be received through and retained and sealed at the lens mounting portion or front housing portion 118 via any suitable retaining and sealing means. Lens assembly 114 is secured or attached to circuit board 112 such that the lens optic or optics function to focus and direct and refract an image of the scene at the field of view of the lens optics onto the imaging sensor. The lens assembly includes at least one optical element and the lens mounting element is attached to the circuit board so as to provide an optical path through the at least one optical element to the imaging sensor at the circuit board.

The circuit board or element 112 of camera or imaging device module 110 includes a camera or image capture device or sensor for capturing an image of a scene occurring exteriorly or interiorly of a vehicle. Camera module 110 may utilize aspects of the cameras or sensors described in U.S. patent applications, Ser. No. 12/091,359, filed Apr. 24, 2008 and published Oct. 1, 2009 as U.S. Publication No. US 2009-0244361; Ser. No. 10/534,632, filed May 11, 2005, now U.S. Pat. No. 7,965,336; and/or Ser. No. 11/201,661, filed Aug. 11, 2005 and published Feb. 23, 2006 as U.S. Publication No. US-2006-0038668, which are hereby incorporated herein by reference in their entireties. Optionally, the images captured by the imaging sensor may be communicated to a display or display system which is operable to display the images to a driver of the vehicle. The camera or imaging sensor useful with the present invention may comprise an imaging array sensor, such as a CMOS sensor or a CCD sensor or the like, such as disclosed in commonly assigned U.S. Pat. Nos. 5,550,677; 5,670,935; 5,796,094; 6,097,023 and/or 7,339,149, which are hereby incorporated herein by reference in their entireties.

In the illustrated embodiment, circuit board 112 is secured or attached or mounted to front housing portion or lens mounting portion 118 to form a circuit board sub-assembly. Circuit board 112 includes circuitry 112a, such as circuitry associated with the imaging sensor. When mounted to the front housing portion 118, circuit board 112 is received within the cavity or pocket defined by the outer walls of the front housing portion 118, with some of the circuitry being located at the opposite side or surface of the circuit board 112 from the lens receiving structure of front housing portion 118. As shown in FIG. 3, circuitry 112a includes a connecting element or header 112b (such as a multi-pin connector or plug or socket type connector or the like) for connecting to a connector or connecting element 122a of wire harness 122.

Wire harness 122 includes electrical connector 122a, such as a plug or socket type connector or the like, at an end of the wires or cable 122b for electrically connecting the wire harness to the connector 112b of circuit board 112. The connector 122a connects to (such as via plugging into) the connector 112b to electrically connect the wire harness to the circuitry of camera module 110, whereby the connector or connectors at the opposite end of wire harness 122 may electrically connect to an electrical connector of the vehicle, so as to provide power and control and signal communication to and from the camera module.

Optionally, the connector 122a of wire harness 122 may be connected to the connector 112b of circuit board 112 prior to or while connecting or mating the housing portions 118, 120 to substantially seal the connection of the wire harness and module. Such a sealed connection may provide a means for retaining the connection without a need for a locking feature at the connectors, and may reduce the strain or provide strain relief for the wire harness at the connection to the camera module.

In the illustrated embodiment, the rear housing portion or rear shell portion 120 includes a main wall portion 120a that defines the cavity of the camera housing or shell when the housing 116 is assembled. A cable receiving portion 120b extends rearward (or generally away from the circuitry 112 and lens assembly 114) from wall portion 120a and is formed to receive the end of the wire harness 122 therein. The cable receiving portion 120b includes a connector receiving portion 120c that is formed so as to receive the connector 122a therein and to retain the connector generally at the rear wall of wall portion 120a and generally facing the cavity of the camera housing. For example, the connector receiving portion may be generally rectangular-shaped for receiving and supporting or retaining a generally rectangular-shaped connector (although the connector receiving portion may have any other shape that is appropriate for or generally corresponds to the shape of the respective connector that is to be received therein). The cable receiving portion 120b also includes an outer generally tube portion 120d that is formed to receive the generally cylindrical cable 122b. For example, the hollow tubular cable receiving portion may be generally cylindrical-shaped for receiving and supporting or retaining a generally cylindrical-shaped cable (although the cable receiving portion may comprise any other shaped tube or hollow tubular element (such as a rectangular or square shaped tube or the like) that is appropriate for or that generally corresponds to the cross-sectional shape of the respective cable that is to be received therein and therethrough). Thus, the rear camera housing portion or shell portion 120 receives cable or wire harness 122 therein and retains connector 122a at a position where the connector 122a is supported for connection to the circuitry connector 112b when the rear housing or shell portion 120 is mated with the front housing or shell portion 118.

The shape of the cable receiving portion 120b thus holds the cable or wires 122b and the cable connector 122a in a desired or appropriate orientation for connecting the cable connector 122a to the circuitry connector or header 112b. Also, the shape of the cable receiving portion 120b retains the generally cylindrical cable portion or wires 122b at the desired or appropriate location and orientation relative to cable connector 122a, thereby reducing strain on the cable and connector when the cable is moved. Such a configuration also provides enhanced sealing at the cable to housing junction to provide enhanced performance and enhanced life cycles of the cameras in the field and when exposed to harsh environmental conditions.

Optionally, and desirably, the camera module 110 may include a wire sleeve 124 that may be positioned at the connector end of the wire harness to encapsulate or encase the wire harness whereby the wire sleeve may be shrink-wrapped around the end of the wire and a portion of the housing portion to encapsulate the end of the wire harness at the housing portion 120. The wire sleeve and housing portion thus substantially encase or encapsulate the electrical connection between the wire harness and the circuit board and may retain the connection and may reduce the strain at the connection of the wire harness to the circuit board of the camera module.

Thus, the present invention provides for plugging the wire harness directly into a PCB header or connector, which provides the most simple and direct electrical path. The housing or shell portion of the present invention provides a strategically shaped camera housing that receives the cable connector and is shaped around the cable connector interface and cable, and thus assures that the connector is properly oriented, properly installed and connected and fully seated with the PCB header or connector when the camera housing or shell is assembled. The housing geometry also provides off axis cable strain relief when it encloses a small portion of the cable end (the end of the cylindrical cable at the cable connector) in the form of a short cylindrical-shaped housing portion. The cylindrical housing feature also serves as an appropriate surface for a thick-walled automotive grade heat shrink tube to bridge across to from the cable. The heat shrink serves as both a seal between the camera housing and cable as well as cable strain relief. Such heat shrink tubes are inexpensive and commercially available in a variety of sizes and grades, and may include a pre-applied adhesive on the interior surface for adhering the tube in place at the housing and cable. When subjected to temperature extremes, heat shrink has a tendency to shrink more when possible, further enhancing the seal and bonds at the cable and camera housing or shell portion. The present invention thus provides a cost advantage over conventional cable exit strategies. Also, the present invention provides quality advantages as well.

Optionally, the housing or shell portion may comprise any suitable material, such as a plastic or polymeric material, or a metallic material, such as zinc, aluminum or magnesium, or the like. Optionally, the polymeric housing portion and/or the polymeric lens mounting portion may include conducting or non-conducting material, such as ferrous material or elements (preferably non-conductive ferrous elements), within or on the plastic material, so that the housing portion and/or lens mounting portion may provide shielding properties for EMC and thus enhanced performance of the camera module, such as described above.

The camera module and circuit chip or board and imaging sensor of the present invention may be implemented and operated in connection with various vehicular vision systems, and/or may be operable utilizing the principles of such other vehicular systems, such as a vehicle headlamp control system, such as the type disclosed in U.S. Pat. Nos. 5,796, 094; 6,097,023; 6,320,176; 6,559,435; 6,831,261; 7,004,606 and 7,339,149, and U.S. patent application Ser. No. 11/105, 757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; and/or 6,320,176, and/or U.S. patent application Ser. No. 11/201,661, filed Aug. 11, 2005 and published Feb. 23, 2006 as U.S. Publication No. US-2006-0038668, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563 and 6,946,978, and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786 and/or 5,786,772, and/or U.S. patent applications, Ser. No. 11/239,980, filed Sep. 30, 2005, now U.S. Pat. No. 7,881, 496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or PCT Application No. PCT/US03/40611, filed Dec. 19, 2003, and published Jul. 15, 2004 as PCT Publication No. WO 2004/058540, and/or U.S. patent application Ser. No. 10/538,724, filed Jun. 13, 2005 and published Mar. 9, 2006 as U.S. Publication No. US-2006-0050018, and/or U.S. provisional applications, Ser. No. 60/630,061, filed Nov. 22, 2004; and Ser. No. 60/667,048, filed Mar. 31, 2005, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. patent applications, Ser. No. 11/201,661, filed Aug. 11, 2005, now U.S. Pat. No. 7,480,149; and/or Ser. No. 11/226,628, filed Sep. 14, 2005 and published Mar. 23, 2006 as U.S. Publication No. US 2006-0061008, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760, 962; 5,715,093; 5,877,897; 6,922,292; 6,757,109; 6,717, 610; 6,590,719; 6,201,642; 6,498,620; 5,796,094; 6,097, 023; 6,320,176; 6,559,435; 6,831,261; 6,806,452; 6,396, 397; 6,822,563; 6,946,978; 7,038,577 and 7,004,606; and/or U.S. patent applications, Ser. No. 11/315,675, filed Dec. 22, 2005, now U.S. Pat. No. 7,720,580; and/or Ser. No. 10/534, 632, filed May 11, 2005, now U.S. Pat. No. 7,965,336; and/or U.S. provisional applications, Ser. No. 60/845,381, filed Sep. 18, 2007; and Ser. No. 60/837,408, filed Aug. 11, 2006, and/or PCT Application No. PCT/US2003/036177 filed Nov. 14, 2003, and published Jun. 3, 2004 as PCT Publication No. WO 2004/047421, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

Optionally, the camera or imaging device may be positioned at an interior rearview mirror assembly of the vehicle, and may be located in the mirror assembly and directed generally forwardly or rearwardly with respect to the direction of travel of the vehicle for providing an exterior field of view in the forward or rearward direction. Optionally, the camera or imaging device may be directed toward one or more locations within the vehicle cabin to provide an interior field of view, such as for a cabin monitoring system or the like.

While the above description constitutes a plurality of embodiments of the present invention, it will be appreciated that the present invention is susceptible to further modification and change without departing from the fair meaning of the accompanying claims.

The invention claimed is:

1. A method for assembling a vehicular camera for a vehicular vision system, said method comprising:
providing a front housing member, the front housing member having a lens receiving portion and a circuit board attachment portion, wherein the circuit board attachment portion of the front housing member has a rectangular shape, and wherein the lens receiving portion is coextensive with the circuit board attachment portion and extends outward therefrom with a cylindrical shape;
wherein providing the front housing member comprises providing a metallic front housing member, and wherein the metallic front housing member is formed of metallic material;
disposing a lens assembly at the lens receiving portion, wherein the lens assembly comprises at least one lens, and wherein at least a portion of the lens assembly is cylindrically shaped, and wherein the lens receiving portion of the front housing member comprises an aperture dimensioned to receive the at least a portion of the lens assembly that is cylindrically shaped;
providing a circuit board having a first side and an opposing second side, wherein an imager is disposed on the first side of the circuit board and a circuit board connector is disposed on the second side of the circuit board, and wherein the imager comprises a CMOS imaging sensor;
attaching the circuit board at the circuit board attachment portion of the front housing member;
wherein, with the circuit board attached at the front housing member, the first side of the circuit board with the imager disposed thereon is closer to the lens assembly than the second side of the circuit board with the circuit board connector disposed thereon;
with the circuit board attached at the front housing member and with the lens assembly disposed at the lens receiving portion of the front housing member, focusing images at an imaging plane of the imager by adjusting the lens assembly relative to the imager;
wherein, with the images focused at the imaging plane of the imager, retaining the lens assembly relative to the front housing member via an ultra-violet (UV) curable adhesive;
providing a rear housing member;
wherein providing the rear housing member comprises providing a metallic rear housing member, and wherein the metallic rear housing member is formed of metallic material; and
attaching the front housing member and the rear housing member, wherein, with the front housing member and the rear housing member attached, outer walls of the front and rear housing members enclose the circuit board.

2. The method of claim 1, wherein the lens receiving portion of the front housing member is threaded, and wherein at least a portion of the lens assembly that is cylindrically shaped is threaded, and wherein disposing the lens assembly at the lens receiving portion comprises threading the lens assembly into the front housing member.

3. The method of claim 2, wherein the UV curable adhesive, when cured, secures threads of the lens assembly to threads of the front housing member.

4. The method of claim 1, wherein attaching the front housing member and the rear housing member comprises sealing the front housing member relative to the rear housing member.

5. The method of claim 1, wherein the front housing member and the rear housing member are attached together by at least one selected from the group consisting of (i) adhesive attachment, (ii) mechanical attachment and (iii) welding.

6. The method of claim 1, comprising providing a plurality of electrically conductive elements terminating at (i) a first connecting end configured to electrically connect to the circuit board connector disposed on the second side of the circuit board and (ii) a second connecting end configured to electrically connect to a wire harness of a vehicle equipped with the vehicular camera and the vehicular vision system.

7. The method of claim 6, wherein the rear housing member comprises a shaped connector receiving portion configured to receive and retain the first connecting end therein, and wherein the first connecting end comprises a shaped connecting end shaped to correspond with the shape of the connector receiving portion.

8. The method of claim 7, comprising a sleeve that circumscribes the electrically conductive elements, and wherein a sealing member circumscribes a portion of the sleeve at the rear of the rear housing member.

9. The method of claim 8, further comprising providing the sealing member at the sleeve and the rear housing member, wherein the sealing member retains and seals the sleeve relative to the rear housing member, and wherein the sealing member comprises a tube that circumscribes the electrically conductive elements and seals around the sleeve at the rear housing member.

10. The method of claim 9, wherein the connector receiving portion is shaped to receive an end of the sleeve of the electrically conductive elements, and wherein the tube circumscribes a portion of the connector receiving portion and seals around the sleeve and the connector receiving portion.

11. The method of claim 1, wherein the circuit board is attached at the circuit board attachment portion of the front housing member by a plurality of fasteners.

12. The method of claim 1, wherein the vehicular camera comprises a rearview camera for a vehicle, and wherein the imager comprises a CMOS imaging sensor.

13. A method for assembling a vehicular camera for a vehicular vision system, said method comprising:
   providing a front housing member, the front housing member having a lens receiving portion and a circuit board attachment portion, wherein the circuit board attachment portion of the front housing member has a rectangular shape, and wherein the lens receiving portion is coextensive with the circuit board attachment portion and extends outward therefrom with a cylindrical shape;
   wherein providing the front housing member comprises providing a metallic front housing member, and wherein the metallic front housing member is formed of metallic material;
   disposing a lens assembly at the lens receiving portion, wherein the lens assembly comprises at least one lens, and wherein at least a portion of the lens assembly is cylindrically shaped, and wherein the lens receiving portion of the front housing member comprises an aperture dimensioned to receive the at least a portion of the lens assembly that is cylindrically shaped;
   providing a circuit board having a first side and an opposing second side, wherein an imager is disposed on the first side of the circuit board and a circuit board connector is disposed on the second side of the circuit board, and wherein the imager comprises a CMOS imaging sensor;
   attaching the circuit board at the circuit board attachment portion of the front housing member;
   wherein, with the circuit board attached at the front housing member, the first side of the circuit board with the imager disposed thereon is closer to the lens assembly than the second side of the circuit board with the circuit board connector disposed thereon;
   with the circuit board attached at the front housing member and with the lens assembly disposed at the lens receiving portion of the front housing member, focusing images at an imaging plane of the imager by adjusting the lens assembly relative to the imager;
   wherein, with the images focused at the imaging plane of the imager, retaining the lens assembly relative to the front housing member via an ultra-violet (UV) curable adhesive;
   providing a rear housing member;
   wherein providing the rear housing member comprises providing a metallic rear housing member, and wherein the metallic rear housing member is formed of metallic material;
   providing a plurality of electrically conductive elements terminating at (i) a first connecting end configured to electrically connect to the circuit board connector disposed on the second side of the circuit board and (ii) a second connecting end configured to electrically connect to a wire harness of a vehicle equipped with the vehicular camera and the vehicular vision system;
   wherein the rear housing member comprises a connector receiving portion configured to retain the first connecting end thereat;
   attaching the front housing member and the rear housing member, wherein, with the front housing member and the rear housing member attached, outer walls of the front and rear housing members enclose the circuit board; and
   wherein the front housing member and the rear housing member are attached together by at least one selected from the group consisting of (i) adhesive attachment, (ii) mechanical attachment and (iii) welding.

14. The method of claim 13, comprising a sleeve that circumscribes the electrically conductive elements, and wherein a sealing member circumscribes a portion of the sleeve at the rear of the rear housing member.

15. The method of claim 13, wherein the circuit board is attached at the circuit board attachment portion of the front housing member by a plurality of fasteners.

16. A method for assembling a vehicular camera for a vehicular vision system, said method comprising:
   providing a front housing member, the front housing member having a lens receiving portion and a circuit board attachment portion, wherein the circuit board attachment portion of the front housing member has a rectangular shape, and wherein the lens receiving portion is coextensive with the circuit board attachment portion and extends outward therefrom with a cylindrical shape;
   wherein providing the front housing member comprises providing a metallic front housing member, and wherein the metallic front housing member is formed of metallic material;
   disposing a lens assembly at the lens receiving portion, wherein the lens assembly comprises at least one lens, and wherein at least a portion of the lens assembly is cylindrically shaped, and wherein the lens receiving portion of the front housing member comprises an aperture dimensioned to receive the at least a portion of the lens assembly that is cylindrically shaped;
   wherein the lens receiving portion of the front housing member is threaded, and wherein at least a portion of the lens assembly that is cylindrically shaped is threaded, and wherein disposing the lens assembly at the lens receiving portion comprises threading the lens assembly into the front housing member;
   providing a circuit board having a first side and an opposing second side, wherein an imager is disposed on the first side of the circuit board and a circuit board connector is disposed on the second side of the circuit board, and wherein the imager comprises a CMOS imaging sensor;
   attaching the circuit board at the circuit board attachment portion of the front housing member;
   wherein the circuit board is attached at the circuit board attachment portion of the front housing member by a plurality of fasteners;
   wherein, with the circuit board attached at the front housing member, the first side of the circuit board with the imager disposed thereon is closer to the lens assembly than the second side of the circuit board with the circuit board connector disposed thereon;
   with the circuit board attached at the front housing member and with the lens assembly disposed at the lens receiving portion of the front housing member, focusing images at an imaging plane of the imager by adjusting the lens assembly relative to the imager;
   wherein, with the images focused at the imaging plane of the imager, retaining the lens assembly relative to the front housing member via an ultra-violet (UV) curable adhesive;
   providing a rear housing member;
   wherein providing the rear housing member comprises providing a metallic rear housing member, and wherein the metallic rear housing member is formed of metallic material;
   providing a plurality of electrically conductive elements terminating at (i) a first connecting end configured to electrically connect to the circuit board connector disposed on the second side of the circuit board and (ii) a second connecting end configured to electrically connect to a wire harness of a vehicle equipped with the vehicular camera and the vehicular vision system;

wherein the rear housing member comprises a connector receiving portion configured to retain the first connecting end thereat; and attaching the front housing member and the rear housing member, wherein, with the front housing member and the rear housing member attached, outer walls of the front and rear housing members enclose the circuit board.

17. The method of claim 16, wherein the UV curable adhesive, when cured, secures threads of the lens assembly to threads of the front housing member.

18. The method of claim 16, wherein the rear housing member comprises a shaped connector receiving portion configured to receive and retain the first connecting end therein, and wherein the first connecting end comprises a shaped connecting end shaped to correspond with the shape of the connector receiving portion.

19. The method of claim 18, comprising a sleeve that circumscribes the electrically conductive elements, and wherein a sealing member circumscribes a portion of the sleeve at the rear of the rear housing member.

20. The method of claim 16, wherein the front housing member and the rear housing member are attached together by at least one selected from the group consisting of (i) adhesive attachment, (ii) mechanical attachment and (iii) welding.

* * * * *